(12) United States Patent
Hikmet et al.

(10) Patent No.: US 11,833,741 B2
(45) Date of Patent: Dec. 5, 2023

(54) 3D PRINTED OBJECT COVERED WITH A HEAT SHRINK

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/915,207

(22) PCT Filed: Mar. 26, 2021

(86) PCT No.: PCT/EP2021/057992
§ 371 (c)(1),
(2) Date: Sep. 28, 2022

(87) PCT Pub. No.: WO2021/198096
PCT Pub. Date: Oct. 7, 2021

(65) Prior Publication Data
US 2023/0118231 A1    Apr. 20, 2023

(30) Foreign Application Priority Data

Mar. 31, 2020 (EP) ..................... 20166936

(51) Int. Cl.
*B29C 64/118* (2017.01)
*B33Y 10/00* (2015.01)
(Continued)

(52) U.S. Cl.
CPC ........ *B29C 64/118* (2017.08); *B29C 63/0065* (2013.01); *B33Y 10/00* (2014.12);
(Continued)

(58) Field of Classification Search
None
See application file for complete search history.

(56) References Cited

U.S. PATENT DOCUMENTS

| 5,121,329 A | 6/1992 | Crump |
| 11,426,924 B2 * | 8/2022 | Gorin .................... B33Y 70/10 |

(Continued)

FOREIGN PATENT DOCUMENTS

| WO | 2001079753 A2 | 10/2001 | |
| WO | WO-2017080951 A1 * | 5/2017 | ............. B05D 5/063 |
| WO | 2018077712 A1 | 5/2018 | |

*Primary Examiner* — Evan P Dzierzynski

(57) ABSTRACT

The invention provides a 3D printed object (210) and a method of manufacturing such an object (210) by means of fused deposition modelling. The method successively comprises the steps of (i) 3D printing a printable material (120) to create a layer stack (230) of printed material (210), wherein the layer stack (210) bounds a space (240), wherein the layer stack (210) has an inner stack surface (231) and an outer stack surface (232), the inner stack surface (231) facing towards the space (240) and the outer stack surface (232) facing away from the space (240), (ii) providing a heat shrink (250) onto the layer stack (230), wherein the heat shrink (250) has an inner heat shrink surface (251) and an outer heat shrink surface (252), the inner heat shrink surface (251) facing towards the outer stack surface (232) and the outer heat shrink surface (252) facing away from the outer stack surface (232), and (iii) applying heat to shrink (250) the heat shrink so that the inner heat shrink surface (251) is in physical contact with the outer stack surface (232) and the heat shrink (250) is conformal to the layer stack (230). The layer stack (230) is light transmissive, and the heat shrink (250) is arranged to provide an optical effect chosen from the group consisting of refraction, diffraction, reflection, diffu- (Continued)

sion and conversion. The 3D printed object (210) may be used as a component of a lighting device (600), such as a lampshade.

15 Claims, 11 Drawing Sheets

(51) Int. Cl.
*B29C 63/00* (2006.01)
*F21V 1/14* (2006.01)
*F21V 1/22* (2006.01)
*F21V 1/26* (2006.01)
*B33Y 80/00* (2015.01)
*B29L 31/00* (2006.01)

(52) U.S. Cl.
CPC ............. *F21V 1/146* (2013.01); *F21V 1/22* (2013.01); *F21V 1/26* (2013.01); *B29K 2995/0049* (2013.01); *B29L 2031/7472* (2013.01); *B33Y 80/00* (2014.12)

(56) References Cited

U.S. PATENT DOCUMENTS

| | | | |
|---|---|---|---|
| 2017/0210063 A1 | 7/2017 | Andres et al. | |
| 2020/0114572 A1* | 4/2020 | Hikmet | B29C 64/209 |
| 2021/0362532 A1* | 11/2021 | Hersch | G07D 7/207 |

* cited by examiner (a)

(b)

(a)

(b)

(a)

(b)

(a)

(b)

(a)

(b)

(a)

(b)

(c)

(d)

3D PRINTED OBJECT COVERED WITH A HEAT SHRINK

CROSS-REFERENCE TO PRIOR APPLICATIONS

This application is the U.S. National Phase application under 35 U.S.C. § 371 of International Application No. PCT/EP2021/057992, filed on Mar. 26, 2021, which claims the benefit of European Patent Application No. 20166936.3, filed on Mar. 31, 2020. These applications are hereby incorporated by reference herein.

FIELD OF THE INVENTION

The invention relates to a method of manufacturing an object by means of 3D printing, in particular by means of fused deposition modelling. The invention also relates to an object obtainable with such a method of manufacturing, and to a lighting device comprising such an object.

BACKGROUND OF THE INVENTION

Digital manufacturing is expected to increasingly transform the nature of global manufacturing. One of the main processes used in digital manufacturing is 3D printing. The term "3D printing" refers to processes wherein a material is joined or solidified under computer control to create a three-dimensional object of almost any shape or geometry. Such three-dimensional objects are typically produced using data from a three-dimensional model, and usually by successively adding material layer by layer.

Many different 3D printing technologies are known in the art.

U.S. Pat. No. 5,121,329 discloses an apparatus incorporating a movable dispensing head provided with a supply of material which solidifies at a predetermined temperature, and a base member, which are moved relative to each other along "X", "Y", and "Z" axes in a predetermined pattern to create three-dimensional objects by building up material discharged from the dispensing head onto the base member at a controlled rate. This 3D printing technology is known as fused deposition modeling (FDM).

FDM, also called fused filament fabrication (FFF) or filament 3D printing (FDP), is one of the most used forms of 3D printing. FDM printers are relatively fast, low cost and can be used for printing complicated three-dimensional objects. Such printers are used in printing various shapes using various 3D printable materials.

In an FDM process, a 3D printer creates an object in a layer-by-layer manner by extruding a printable material (typically a filament of a thermoplastic material) along tool paths that are generated from a digital representation of the object. The printable material is heated just beyond solidification and extruded through a nozzle of a print head of the 3D printer. The extruded printable material fuses to previously deposited material and solidifies upon a reduction in temperature. In a typical 3D printer, the printable material is deposited as a sequence of planar layers onto a substrate that defines a build plane. The position of the print head relative to the substrate is then incremented along a print axis (perpendicular to the build plane), and the process is repeated until the object is complete.

SUMMARY OF THE INVENTION

Objects that have been manufactured by means of FDM typically show a characteristic ribbed surface structure, which originates from the deposited filaments. Depending on the intended application of the object, such a ribbed surface structure may not be desired. For example, for certain applications it is preferred that the surface structure is smooth, or at least as smooth as possible. This can be achieved by executing a finalization stage after the printing stage. Such a finalization stage may include one or more post processing steps, such as a polishing step, a solvent treatment step or a coating step.

FDM is currently being further developed in the production of various components for use in lighting devices, such as reflectors, diffusers and lamp shades for luminaires. For at least several of such components it is preferred that they have a smooth surface, not only for aesthetical reasons (for example, hiding the ribbed surface structure) but also for technical reasons (for example, providing a desired optical function, such as reflection of light).

It is an object of the present invention to address the aforementioned need. In a first aspect, the invention provides a method of manufacturing an object by means of fused deposition modelling, wherein the method comprises the step of 3D printing a printable material to create a layer stack of printed material, wherein the layer stack bounds a space, and wherein the layer stack has an inner stack surface and an outer stack surface, the inner stack surface facing towards the space and the outer stack surface facing away from the space. The method also comprises the step of providing a heat shrink onto the layer stack, wherein the heat shrink has an inner heat shrink surface and an outer heat shrink surface, the inner heat shrink surface facing towards the outer stack surface and the outer heat shrink surface facing away from the outer stack surface. The method further comprises the step of applying heat to shrink the heat shrink so that the inner heat shrink surface is in physical contact with the outer stack surface and the heat shrink is conformal to the layer stack. In the aforementioned method, the layer stack is light transmissive, and the heat shrink is arranged to provide an optical effect chosen from the group consisting of refraction, diffraction, reflection, diffusion and conversion.

The term "printable material" refers to the material to be deposited or printed, and the term "printed material" refers to the material that is obtained after deposition. These materials may be essentially the same, as the printable material may especially refer to the material in a printer head or extruder at elevated temperature and the printed material refers to the same material, but in a later stage when deposited. The printable material is typically printed as a filament and deposited as such. The printable material may be provided as a filament or it may be formed into a filament.

The term "printable material" may refer to a single type of printable material but it may also refer to a plurality of different printable materials. Similarly, the term "printed material" may refer to a single type of printed material but it may also refer to a plurality of different printed materials.

Suitable examples of printable materials can be selected from the group consisting of glasses, (thermoplastic) polymers, and silicones. Especially, the printable material may be a (thermoplastic) polymer selected from the group consisting of polystyrenes (such as acrylonitrile butadiene styrene (ABS)), polyamides (such as nylon), polyacetates, polyesters (such as polylactic acid (PLA) and polyethylene terephthalate (PET)), polyacrylates (such as polymethylmethacrylate (PMMA)), polyethylenes (such as low-density polyethylene (LDPE) and high-density polyethylene (HDPE)), polypropylenes, polyvinyl chloride (PVC), polycarbonate (PC), sulfide containing polymers (such as polysulfone), and polyurethanes.

The method according to the first aspect successively comprises the steps of 3D printing a printable material to create a layer stack of printed material, providing a heat shrink onto the layer stack, and applying heat to shrink the heat shrink. The term "successively" should be interpreted as indicating an order wherein the aforementioned method steps are performed. The method may include additional method steps, even in between two of the aforementioned method steps, as long as the order of the aforementioned method steps is maintained.

The step of 3D printing a printable material creates a layer stack of printed material, wherein the layer stack bounds a space. This means that at least a part of the boundary of the space is formed by the layer stack. The layer stack may surround or enclose the space. In that case the space may also be referred to as a cavity or an enclosure. The surface of the layer stack that faces towards the space is referred to as the inner stack surface, and the surface of the layer stack that faces away from the space is referred to as the outer stack surface. Each of the inner stack surface and the outer stack surface may be a planar surface or a curved surface.

The layer stack that is created in the aforementioned method step may have at least 50 layers of printed material. Each of the inner stack surface and the outer stack surface may have a surface area of at least 100 square centimeters.

After the layer stack of printed material has been created, a heat shrink is provided onto the layer stack. The term "heat shrink" refers to a component that exhibits shrinkage upon heating. A heat shrink is typically a shrinkable plastic tube or sleeve, that can be placed onto or around an item so that upon heating it tightly fits or wraps around the item.

The surface of the heat shrink that faces towards the outer stack surface of the layer stack is referred to as the inner heat shrink surface, and the surface of the heat sink that faces away from the outer stack surface of the layer stack is referred to as the outer heat shrink surface.

The heat shrink may have any shape, such as a tubular shape or a conical shape. After the heat shrink has been provided onto the layer stack, heat is applied to shrink the heat shrink. During shrinking, the dimensions of the heat shrink change and the heat sink makes physical contact with the outer stack surface. When the shrinking is complete, the heat shrink is conformal to the layer stack. The step of applying heat may be performed in an oven, with a hot air gun or by using any other source of hot gas flow.

When the inner heat shrink surface is in physical contact with the outer stack surface and the heat shrink is conformal to the layer stack, the configuration is kept in place by means of friction between the closely conforming heat shrink and layer stack. The heat shrink may have an adhesive layer on the inner heat shrink surface to further improve adhesion to the outer stack surface.

In the method according to the first aspect, a layer stack that is light transmissive is created by means of 3D printing. In addition to the light transmissive layer stack, the method may also include the creation of one or more further layer stacks by means of 3D printing, wherein one or more of these further layer stacks may be light transmissive as well, or opaque.

A layer stack is light transmissive when at least part of the layer stack is capable of letting light pass therethrough. A layer stack is opaque when at the layer stack as a whole is incapable of letting light pass therethrough.

The term "light transmissive" encompasses the terms "translucent" and "transparent". The term "transparent" refers to the physical property of allowing light to pass through the material without appreciable scattering of light. The term "translucent" refers to the physical property of allowing light to pass through, wherein the photons may be scattered at an interface. An opaque layer stack is neither transparent nor translucent. Instead, an opaque layer stack reflects, scatters and/or absorbs all light that is incident thereon.

In the method according to the first aspect, the heat shrink is arranged to provide an optical effect chosen from the group consisting of refraction, diffraction, reflection, diffusion and conversion.

The term "refraction" refers to the change in direction of a light ray passing from one medium to another or from a gradual change in the medium. Prisms and lenses may be used to redirect light by means of refraction.

The term "diffraction" refers to various phenomena that occur when a light ray encounters an obstacle or a slit. It may be defined as the bending of light rays around the corners of an obstacle or through an aperture into the region of geometrical shadow of the obstacle or aperture, wherein the diffracting object or aperture effectively becomes a secondary source of the propagating light ray.

The term "reflection" refers to the change in direction of a light ray at an interface between two different media so that the light ray returns into the medium from which it originated. For specular reflection, the angle at which the light ray is incident on the surface equals the angle at which it is reflected. Specular reflection may be achieved by means of a mirror. For diffuse reflection, a light ray that is incident on a surface is scattered at many angles rather than at just one angle as in the case of specular reflection.

The term "diffusion" refers to a situation wherein a light ray travels through a material without being absorbed, but rather undergoes repeated scattering events which change the direction of its path.

The term "conversion" refers to a change in wavelength of a light ray, such as by means of photoluminescence, wherein light is emitted from any form of matter after absorption of electromagnetic radiation. Conversion of light by means of photoluminescence may be achieved by using a phosphor.

The heat shrink may only partially be arranged onto the layer stack to provide one or more of the aforementioned optical effects. The heat shrink may cover at least 80% of the layer stack, such as at least 90% of the layer stack or the complete layer stack.

The heat shrink may be partially reflective (such as in a range from 10% to 40%) and partially light transmissive (such as in a range from 60% to 90%). This results in an improved optical effect, because part of the light is redirected by the partially reflective heat shrink, while the heat shrink is still transmitting light. Such an optical effect may be desired in components for lighting applications, such as lampshades.

The heat shrink may have a reflectance of 85% or higher. The heat shrink may be a specularly reflective heat shrink.

The heat shrink may comprise a polymer material, such as a thermoplastic material. Examples of suitable thermoplastic materials are polyolefins, fluoropolymers (such as fluorinated ethylene propylene, or FEP, and polytetrafluoroethylene, or PTFE), polyvinylchloride (PVC), neoprene, and silicone elastomers. The polymer material may have certain features for providing one or more of the aforementioned optical effects, such as refraction features and/or diffraction features. For providing the optical effect of conversion, the polymer material may comprise a luminescent material. For providing the optical effect of reflection, the polymer may comprise reflective particles such as flakes or glitters and/or the polymer may comprise scattering particles such as $BaSO_4$ particles, $Al_2O_3$ particles and $TiO_2$ particles.

The heat shrink may be a heat sink that comprises a first layer and a second layer, wherein the first layer is a polymer layer and the second layer is a layer for providing one or more of the aforementioned optical effects, and wherein the inner heat shrink surface is a surface of the second layer. A layer for providing one or more of the aforementioned optical effects may also be referred to as an optical layer. An example of an optical layer is a metal layer. The metal layer may have been applied by means of a deposition method such as physical vapor deposition (PVD) or chemical vapor deposition (CVD). Examples of suitable physical vapor deposition techniques are sputtering and evaporation.

The heat shrink may be a heat sink that comprises a first layer and a second layer, wherein the first layer is a decorative layer and the second layer is an optical layer, wherein the outer heat shrink surface is a surface of the first layer (i.e. the decorative layer), and wherein the inner heat shrink surface is a surface of the second layer (i.e. the optical layer). The decorative layer may be a colored layer, a patterned layer or a textured layer.

The layer stack may be transparent. A transparent layer stack allows light to pass through the layer stack without appreciable scattering of light. With a transparent layer stack, any influence of the layer stack on the optical effect provided by the heat sink may be minimized. Furthermore, a transparent layer stack may allow light collimation.

Alternatively, the layer stack may also be arranged to provide an optical effect chosen from the group consisting of refraction, diffraction, reflection, diffusion and conversion. In this case, each of the layer stack and the heat shrink is arranged to provide an optical effect, and if these optical effects are different, each of them may supplement or enhance the other.

Between the steps of 3D printing a printable material to create a light transmissive layer stack and providing a heat shrink onto the light transmissive layer stack, a light source may be arranged relative to the light transmissive layer stack so that after the step of applying heat to shrink the heat shrink, the light source is sandwiched between the heat shrink and the light transmissive layer stack. The light source may be arranged to emit light in a direction towards the light transmissive layer stack and/or in a direction towards the heat shrink. The light source may comprise one or more light emitting elements, such as light emitting diodes (LEDs).

Instead of arranging a light source in a separate step as described above, one may also use a heat shrink that already has a light source integrated therein or attached thereto.

In a second aspect, the invention provides an object obtainable with the method according to the first aspect.

The object according to the second aspect comprises a space that is bounded by a layer stack of 3D printed material. The layer stack has an inner stack surface and an outer stack surface, wherein the inner stack surface faces towards the space and the outer stack surface faces away from the space. The object further comprises a heat shrink. The heat shrink has an inner heat shrink surface and an outer heat shrink surface, wherein the inner heat shrink surface faces towards the outer stack surface and the outer heat shrink surface faces away from the outer stack surface. The inner heat shrink surface is in physical contact with the outer stack surface and the heat shrink is conformal to the layer stack. The layer stack is light transmissive, and the heat shrink is arranged to provide an optical effect chosen from the group consisting of refraction, diffraction, reflection, diffusion and conversion.

The object according to the second aspect may be a lampshade. A lampshade is a fixture for covering a light source of a lighting device, typically to diffuse the light emitted by the light source. Instead of, or in addition to, diffusion, the lampshade may be arranged to provide one or more other optical effects, such as refraction, diffraction, reflection and conversion. If the object is a lampshade, it may further comprise a socket for receiving a light source.

In a third aspect, the invention provides a lighting device comprising an object according to the second aspect.

The lighting device further comprises a light source that is arranged in the space that is bounded by the layer stack of the object. The light source is arranged to emit light towards the layer stack so that at least part of the light emitted by the light source passes through the layer stack to undergo the optical effect provided by the heat shrink.

In the lighting device according to the third aspect, the object according to the second aspect is arranged to perform the function of a lampshade.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
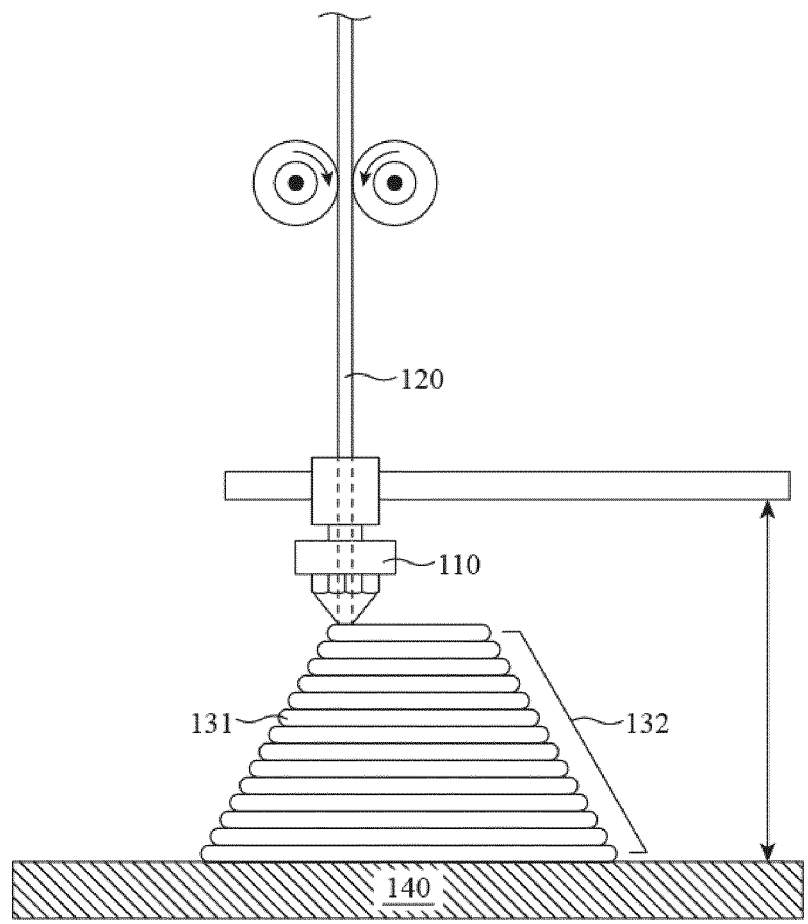
FIG. 1 shows a 3D printer in the process of manufacturing an object by means of fused deposition modelling.

FIG. 1 shows a 3D printer in the process of manufacturing an object by means of fused deposition modelling. The 3D printer has a print head 110. Printable material 120 is extruded through a nozzle of the print head 100. The printable material 120 is deposited onto a build plane 140 to form a layer stack 132, comprising layers of printed material 131.

Figure 2:
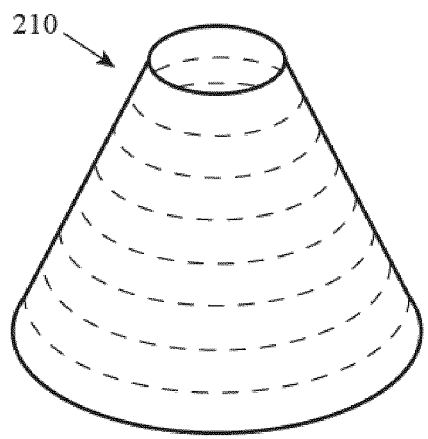
FIGS. 2(a) and 2(b) show an object after it has been manufactured by means of fused deposition modelling.
Figure 2:
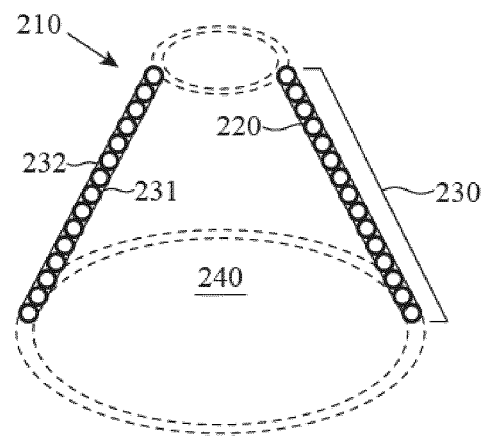

FIGS. 2(a) and 2(b) show an object 210 after it has been manufactured by means of fused deposition modelling. The object 210 is shaped as a hollow truncated cone. In FIG. 2(a), the dashed lines are to indicate that the object 210 is built up of a sequence of layers.

FIG. 2(b) shows a cross section of the object 210 in a vertical plane. The cross section shows the individual layers of printed material 220 that together form a layer stack 230, which in turn constitutes the object 210. This cross section clearly illustrates the ribbed surface structure that is characteristic for an object made by means of fused deposition modelling.

The layer stack 230 bounds a space 240. The space 240 is the interior of the hollow truncated cone. The layer stack 230 has an inner stack surface 231 and an outer stack surface 232. The inner stack surface 231 faces towards the space 240 (the interior of the hollow truncated cone) and the outer stack surface 232 faces away from the space 240 (the exterior of the hollow truncated cone).

Figure 3:
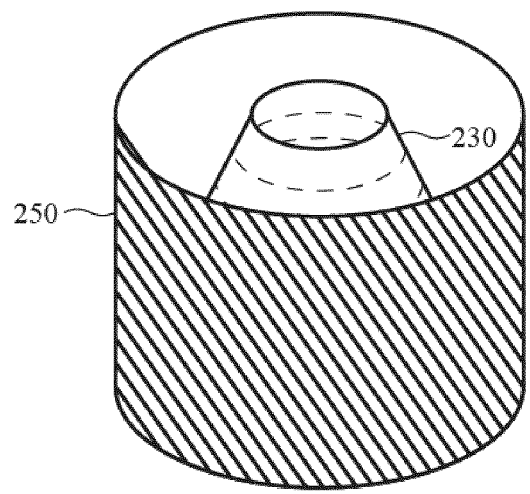
FIGS. 3(a) and 3(b) show the object of FIGS. 2(a) and 2(b), together with a heat shrink.
Figure 3:
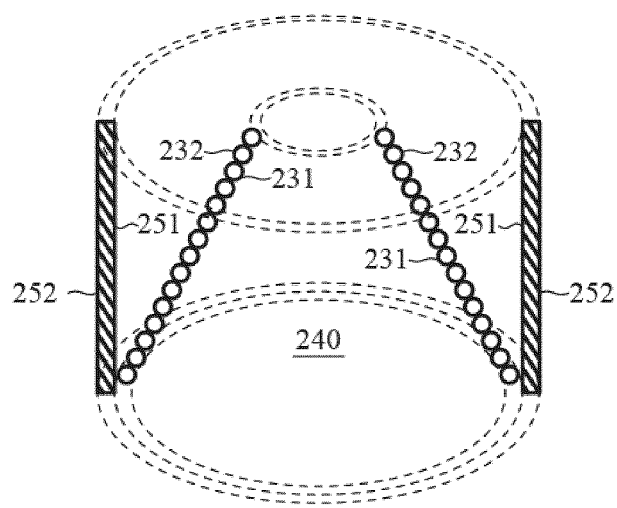

FIG. 3(a) again shows the object 210, but now also a heat shrink 250 is provided. The heat shrink 250 is shaped as a right circular cylinder. In other words, the heat shrink 250 is a tube with a circular cross section.

FIG. 3(b) shows a cross section of the object 210 and the heat shrink 250 in a vertical plane. The heat shrink 250 has an inner heat shrink surface 251 and an outer heat shrink surface 252. The inner heat shrink surface 251 faces towards the outer stack surface 232. The outer heat shrink surface 252 faces away from the outer stack surface 252.

Figure 4:
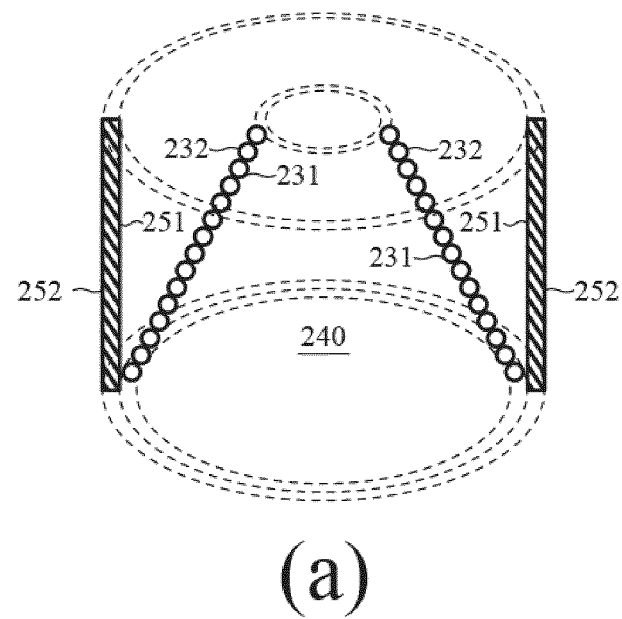
FIGS. 4(a) and 4(b) show the object of FIGS. 3(a) and 3(b), before and after the heat shrink has been shrunk, respectively.
Figure 4:
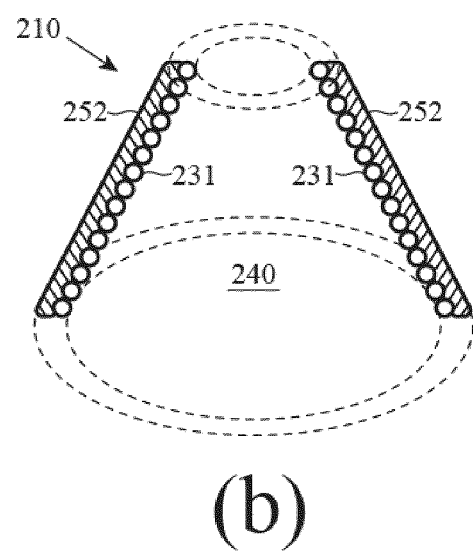

FIG. 4(a) again shows the cross section of FIG. 3(b). FIG. 4(b) shows the object 210 after the heat shrink 250 has been shrunk to bring the inner heat shrink surface 251 in physical contact with the outer stack surface 232 and to make the heat shrink 250 conformal to the layer stack 230 (the reference numerals 232 and 251 are not shown in FIG. 4(b) for the sake of clarity). For the object 210 as shown in FIG. 4, the complete layer stack 230 is covered with the heat shrink 250. Alternatively, only a part of a layer stack may be covered with a heat shrink. Also, an object may have two or more different layer stacks, of which a first sub-set of layer stacks is covered with one or more heats shrinks while a second sub-set of layer stacks is not covered with a heat shrink.

Figure 5:
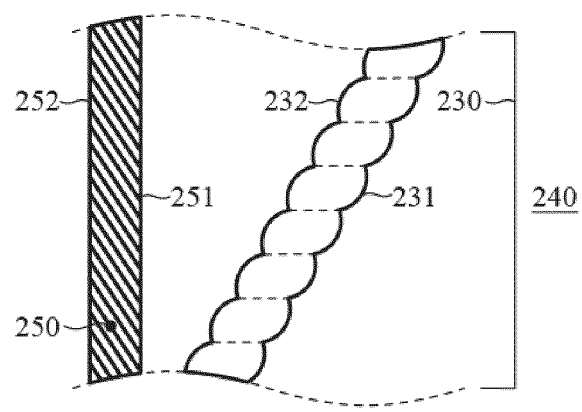
FIGS. 5(a) and 5(b) show close-ups of FIGS. 4(a) and 4(b), respectively.
Figure 5:
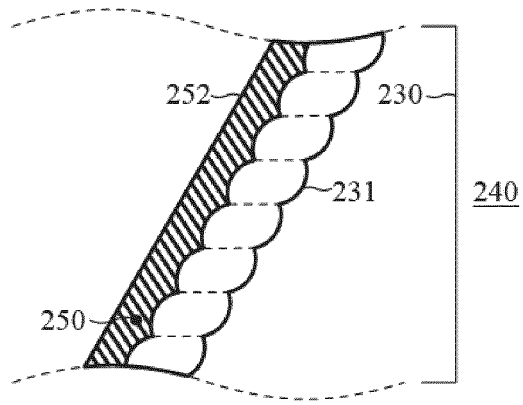

FIG. 5(a) shows a close-up of the cross section of FIG. 4(a). The close-up contains part of the layer stack 230, part of the space 240 and part of the heat shrink 250, with the inner stack surface 231, the outer stack surface 232, the inner heat shrink surface 251 and the outer heat shrink surface 252.

FIG. 5(b) shows the situation after applying heat to the heat shrink 250. The inner heat shrink surface 251 is now in physical contact with the outer stack surface 232 (the reference numerals 232 and 251 are not shown in FIG. 5(b) for the sake of clarity) and the heat shrink 250 is conformal to the layer stack 230. The inner surface of the object 210 is still formed by the inner stack surface 231, which exhibits the characteristic ribbed surface texture. At least a part of the outer surface of the object 210 is now formed by the outer heat shrink surface 252 and no longer by the outer stack surface 232. Depending on the thickness of the heat shrink 250, the characteristic ribbed surface texture of the outer stack surface 232, insofar as it is covered by the heat shrink 250, is flattened or smoothed.

For the object 210 illustrated in FIGS. 2 to 5, the layer stack 230 is transparent. In other words, light may pass through the layer stack 230 without appreciable scattering of light. For the purpose of the invention, the layer stack does not have to be transparent, as long as it is light transmissive.

For the object 210 illustrated in FIGS. 2 to 5, the heat shrink 250 is arranged to provide the optical effect of reflection. In other words, the heat shrink 250 is light reflective. For the purpose of the invention, the heat shrink 250 does not have to be light reflective. Instead of being light reflective, or in addition to being light reflective, the heat shrink may be arranged to provide one or more of the optical effects of refraction, diffraction, diffusion and conversion.

Figure 6:
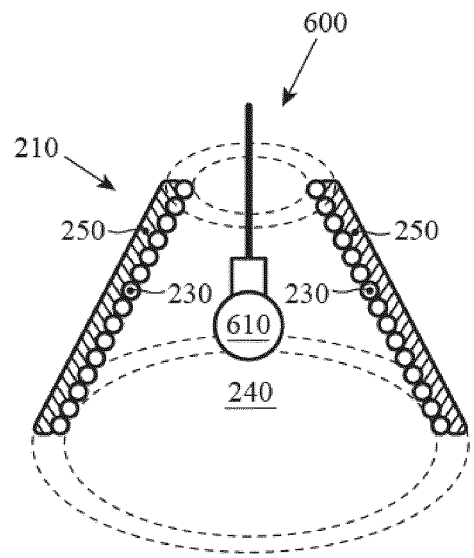
FIGS. 6(a) and 6(b) show a lighting device comprising an object as a lampshade and a light source.
Figure 6:
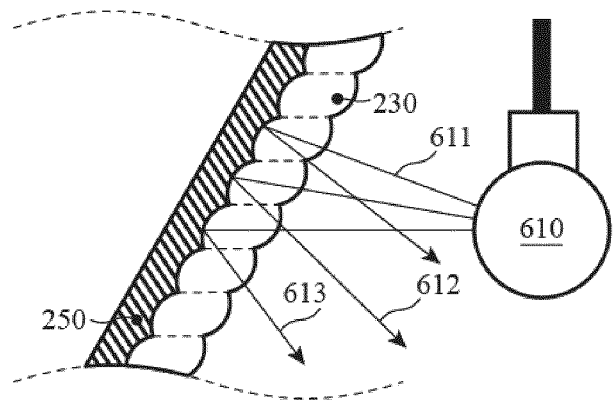

The object 210 can be used as a lampshade in a lighting device. FIGS. 6(a) and 6(b) show such a lighting device 600, comprising the object 210 as a lampshade and a light source 610 that is arranged in the space 240. The light source 610 is arranged to emit light towards the layer stack 230 so that at least part of the light emitted by the light source 610 passes through the layer stack 230 to be reflected by the heat shrink 250. FIG. 6(b) shows a close-up of the lighting device 600 when the light source 610 is emitting light. Light rays 611, 612 and 613 are emitted by the light source 610 and pass through the layer stack 230 before being reflected by the heat shrink 250.

As already mentioned, instead of being light reflective, or in addition to being light reflective, the heat shrink may be arranged to provide one or more other optical effects, such as refraction and diffusion. This is illustrated in FIGS. 7(a) to 7(d).

Figure 7:
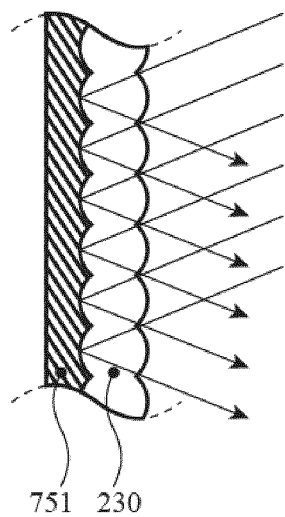
FIGS. 7(a) to 7(d) show heat shrinks capable of providing various optical effects.
Figure 7:
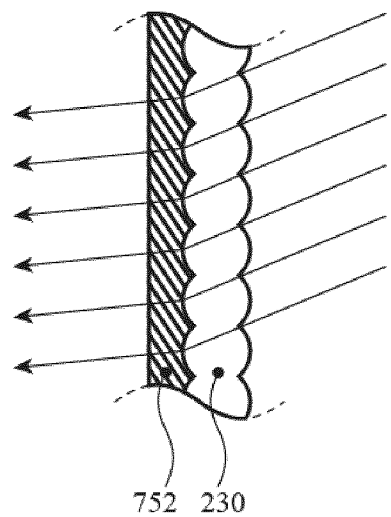
Figure 7:
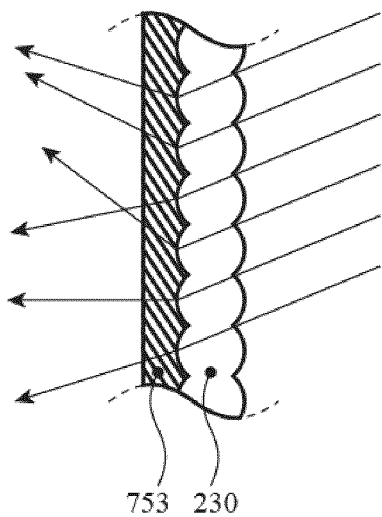
Figure 7:
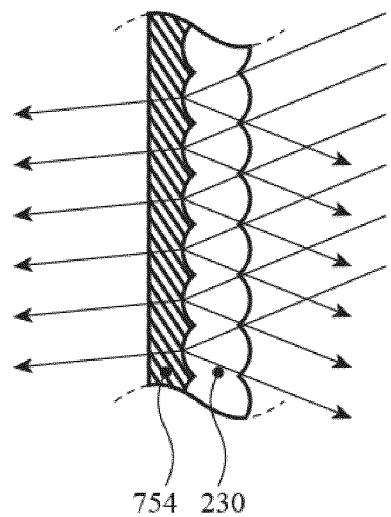

FIG. 7(a) shows a close-up of a situation wherein the heat shrink 751 is specularly reflective. FIG. 7(b) shows a close-up of a situation wherein the heat shrink 752 is refractive. FIG. 7(c) shows a close-up situation wherein the heat shrink 753 is diffusive. A heat shrink may also arranged to provide the optical effects of diffraction and conversion.

Furthermore, a heat shrink may be arranged to provide a combination of two or more of the aforementioned optical effects. FIG. 7(d) shows a close-up situation wherein the heat shrink 754 is partially reflective and partially light transmissive.

Figure 8:
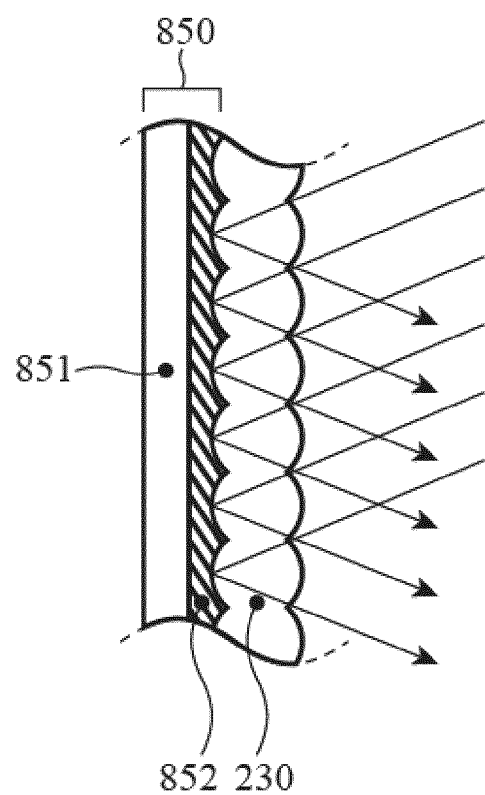
FIG. 8 shows a close-up of an object wherein the heat shrink comprises two layers.

FIG. 8 shows a close-up of a situation wherein the heat shrink 850 comprises a first layer 851 and a second layer 852. The first layer 851 comprises a polymer material, and the second layer 852 is a metal layer. The second layer 852 is reflective and is in contact with the layer stack 230. Alternatively, the first layer may be in contact with the layer stack 230, in which case the first layer is preferably light transmissive.

Figure 9:
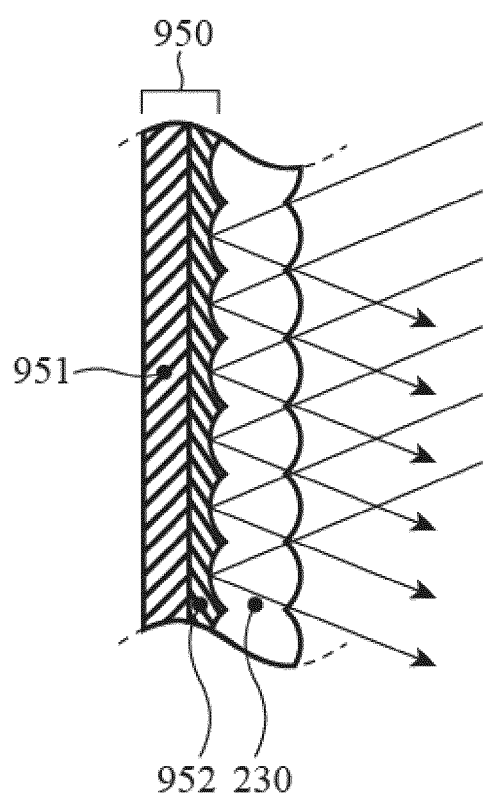
FIG. 9 shows a close-up of an object wherein the heat shrink comprises two layers.

FIG. 9 shows a close-up of a situation wherein the heat shrink 950 comprises a first layer 951 and a second layer 952. The first layer 951 is a decorative layer in the form of a colored layer. The second layer 952 is a reflective metal layer. The outer heat shrink surface is a surface of the first layer 951, and the inner heat shrink surface is a surface of the second layer 952. In other words, the first layer 951 is arranged to determine the outer appearance (color) of the object, while the second layer 952 is arranged to provide an optical effect (reflection) upon receiving light rays through the layer stack 230. Alternatively, the first layer may be a decorative layer of a different type, such as a patterned layer or a textured layer. Also, the second layer may be arranged to provide a different optical effect, such as diffusion or conversion.

Figure 10:
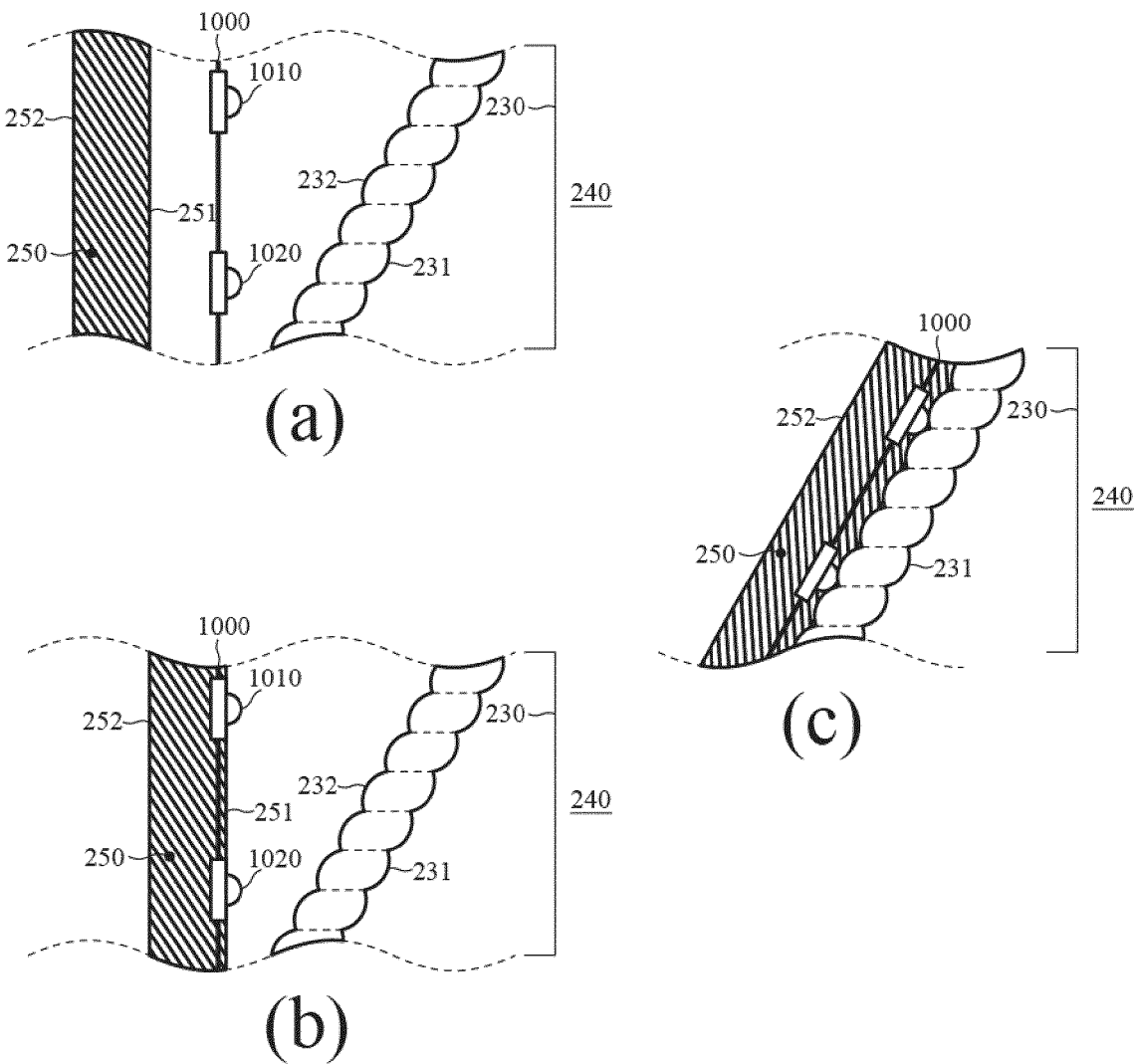
FIGS. 10(a) to 10(c) show an object wherein a light source is sandwiched between a heat shrink and a layer stack.

FIGS. 10(a) to 10(c) show cross sectional views similar to those of FIGS. 4(a) and 4(b).

In FIG. 10(a), a light source 1000 is arranged relative to the layer stack 230 prior to the step of applying heat to shrink the heat shrink 250. In FIG. 10(b), the light source 1000 is integrated into the heat shrink 250.

As shown in FIG. 10(c), for the situations illustrated in FIGS. 10(a) and 10(b), after applying heat to shrink the heat shrink 250, the light source 1000 is sandwiched between the heat shrink 250 and the light transmissive layer stack 230.

In FIGS. 10(a) to 10(c), the light source 1000 comprises at least two light-emitting diodes (LEDs) 1010 and 1020, respectively, that are arranged to emit light in a direction towards the light transmissive layer stack 230. Alternatively, the light source may be arranged to emit light in a direction away from the layer stack 230.

Figure 11:
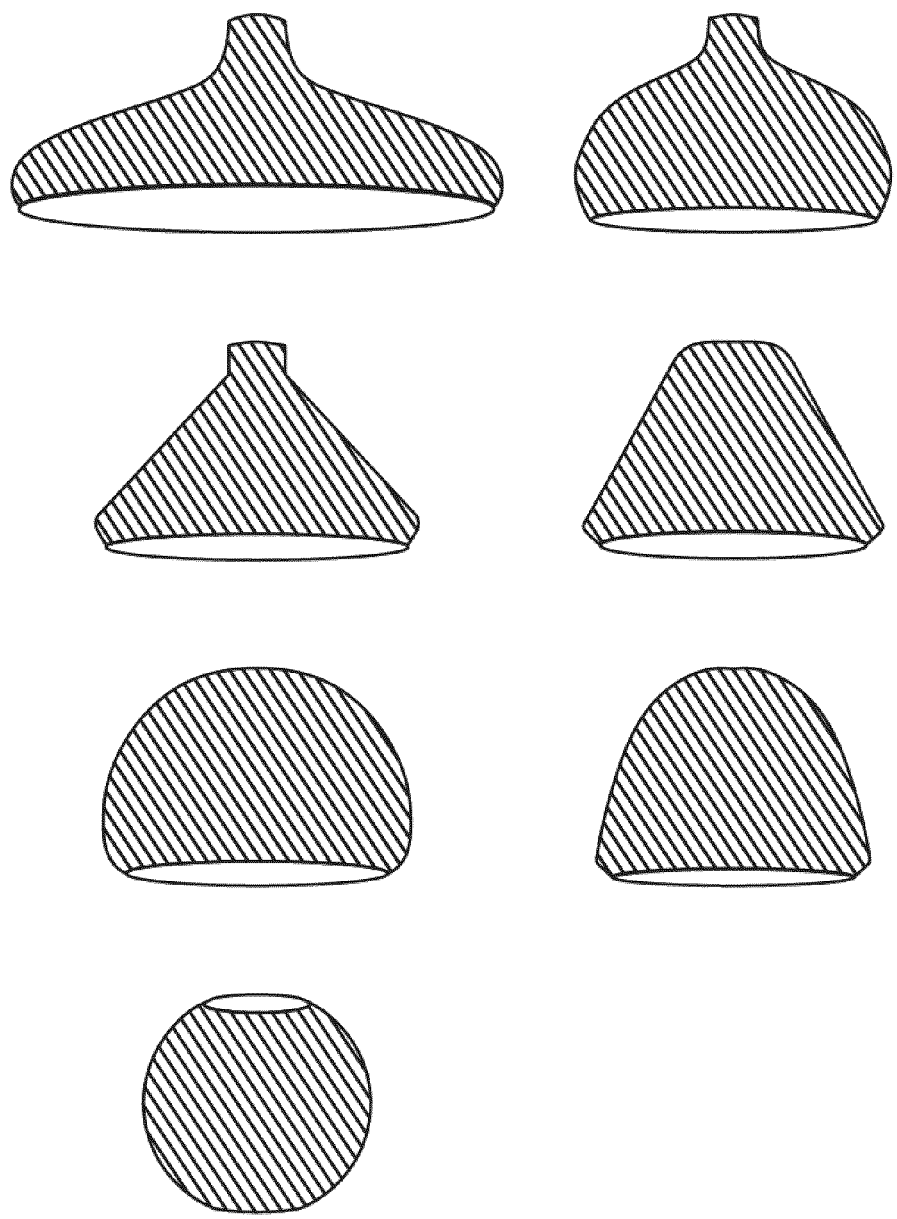
FIG. 11 shows various shapes that an object may have.

In the above description, the object 210 is shaped as a hollow truncated cone and it may be used as a lampshade. This is merely for illustration purposes. The object may have any suitable shape, as long as it has a light transmissive layer stack that bounds a space. Other suitable shapes for the object are illustrated in FIG. 11. Furthermore, the object may also be for use as a different component in a lighting device, such as a reflector, a diffuser or a collimator.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The various aspects discussed in this patent can be combined in order to provide additional advantages. Further, the person skilled in the art will understand that embodiments can be combined, and that also more than two embodiments can be combined.

The invention claimed is:

1. A method of manufacturing an object by means of fused deposition modelling, the method successively comprising the steps of:
    3D printing a printable material to create a layer stack of printed material, wherein the layer stack bounds a space, wherein the layer stack has an inner stack surface and an outer stack surface, the inner stack surface facing towards the space and the outer stack surface facing away from the space,
    providing a heat shrink onto the layer stack, wherein the heat shrink has an inner heat shrink surface and an outer heat shrink surface, the inner heat shrink surface facing towards the outer stack surface and the outer heat shrink surface facing away from the outer stack surface, and
    applying heat to shrink the heat shrink so that the inner heat shrink surface is in physical contact with the outer stack surface and the heat shrink is conformal to the layer stack,
    wherein the layer stack is light transmissive, and
    wherein the heat shrink is arranged to provide an optical effect chosen from the group consisting of refraction, diffraction, reflection, diffusion and conversion.

2. The method according to claim 1, wherein the heat shrink is partially reflective and partially light transmissive.

3. The method according to claim 1, wherein the heat shrink is specularly reflective and/or has a reflectance of 85% or higher.

4. The method according to claim 1, wherein the heat shrink comprises a polymer material, and wherein the polymer material comprises at least one of:
    a luminescent material for providing the optical effect of conversion, and
    reflective particles for providing the optical effect of reflection.

5. The method according to claim 4, wherein the reflective particles are chosen from the group consisting of flakes, glitters, $BaSO_4$ particles, $Al_2O_3$ particles and $TiO_2$ particles.

6. The method according to claim 1, wherein the heat shrink comprises a first layer and a second layer, wherein the first layer comprises a polymer material, and wherein the second layer is a metal layer.

7. The method according to claim 1, wherein the heat shrink comprises a first layer and a second layer, wherein the first layer is a decorative layer chosen from the group consisting of colored layers, patterned layers and textured layers, wherein the second layer is an optical layer for providing the optical effect, wherein the outer heat shrink surface is a surface of the first layer, and wherein the inner heat shrink surface is a surface of the second layer.

8. The method according to claim 1, wherein the layer stack is transparent.

9. The method according to claim 1, wherein the layer stack is arranged to provide an optical effect chosen from the group consisting of refraction, diffraction, reflection, diffusion and conversion.

10. The method according to claim 1, wherein, between the steps of 3D printing the printable material to create the layer stack and providing the heat shrink onto the layer stack the method further comprises the step of arranging a light source relative to the layer stack so that after the step of applying heat to shrink the heat shrink the light source is sandwiched between the heat shrink and the layer stack, wherein the light source is arranged to emit light in a direction towards the layer stack and/or in a direction towards the heat shrink.

11. The method according to claim 1, wherein the heat shrink has a light source integrated therein or attached thereto, so that after the step of applying heat to shrink the heat shrink, the light source is arranged to emit light in a direction towards the layer stack and/or in a direction away from the layer stack.

12. An object comprising a space that is bounded by a layer stack of 3D printed material,
    wherein the layer stack has an inner stack surface and an outer stack surface, the inner stack surface facing towards the space and the outer stack surface facing away from the space,
    wherein the object further comprises a heat shrink having an inner heat shrink surface and an outer heat shrink surface, the inner heat shrink surface facing towards the outer stack surface and the outer heat shrink surface facing away from the outer stack surface,
    wherein the inner heat shrink surface is in physical contact with the outer stack surface and the heat shrink is conformal to the layer stack,
    wherein the layer stack is light transmissive, and
    wherein the heat shrink is arranged to provide an optical effect chosen from the group consisting of refraction, diffraction, reflection, diffusion and conversion.

13. The object according to claim 12, wherein the object is a lampshade.

14. The object according to claim 13, wherein the object further comprises a socket for receiving a light source.

15. A lighting device comprising the object according to claim 13, wherein the lighting device further comprises a light source that is arranged in the space, and wherein the light source is arranged to emit light towards the layer stack so that at least part of the light emitted by the light source passes through the layer stack to undergo the optical effect provided by the heat shrink.

\* \* \* \* \*